United States Patent
Vetter

(10) Patent No.: US 8,198,866 B2
(45) Date of Patent: Jun. 12, 2012

(54) INDICATING CHARGING STATE OF HANDHELD ELECTRIC APPLIANCE

(75) Inventor: Ingo Vetter, Bad Camberg (DE)

(73) Assignee: Braun GmbH, Kronberg (DE)

( * ) Notice: Subject to any disclaimer, the term of this patent is extended or adjusted under 35 U.S.C. 154(b) by 434 days.

(21) Appl. No.: 12/377,814

(22) PCT Filed: Aug. 8, 2007

(86) PCT No.: PCT/EP2007/007002
§ 371 (c)(1),
(2), (4) Date: Feb. 17, 2009

(87) PCT Pub. No.: WO2008/019789
PCT Pub. Date: Feb. 21, 2008

(65) Prior Publication Data
US 2010/0033133 A1    Feb. 11, 2010

(30) Foreign Application Priority Data

Aug. 14, 2006  (DE) .......................... 10 2006 038 127

(51) Int. Cl.
*H02J 7/00* (2006.01)
*G08B 21/00* (2006.01)
*B26B 19/30* (2006.01)
(52) U.S. Cl. ..................... 320/136; 320/107; 340/636.1; 340/636.21; 30/45
(58) Field of Classification Search .................. 320/136, 320/107; 340/636.1, 63.21; 30/45
See application file for complete search history.

(56) References Cited

U.S. PATENT DOCUMENTS

| 5,274,735 | A | | 12/1993 | Okada | |
|---|---|---|---|---|---|
| 5,793,189 | A | * | 8/1998 | Kawaguchi et al. | 322/28 |
| 6,140,802 | A | * | 10/2000 | Lundell et al. | 320/136 |
| 6,276,975 | B1 | | 8/2001 | Knight | |
| 6,388,426 | B1 | * | 5/2002 | Yokoo et al. | 320/136 |
| 7,508,171 | B2 | * | 3/2009 | Carrier et al. | 320/138 |
| 2005/0077878 | A1 | * | 4/2005 | Carrier et al. | 320/134 |
| 2006/0059696 | A1 | | 3/2006 | Derby et al. | |

FOREIGN PATENT DOCUMENTS

| DE | 101 41 125 | 6/2000 |
|---|---|---|
| DE | 198 59 622 | 6/2000 |
| EP | 0 425 044 | 5/1991 |
| EP | 0 674 979 | 10/1995 |
| EP | 0 712 007 | 9/1999 |
| WO | WO97/22172 | 6/1997 |
| WO | WO98/25736 | 6/1998 |
| WO | WO2004/073941 | 9/2004 |

* cited by examiner

*Primary Examiner* — Patrick Assouad
*Assistant Examiner* — Steve T Chung
(74) *Attorney, Agent, or Firm* — David K Mattheis; Kim W Zerby

(57) ABSTRACT

In one aspect, a handheld electric appliance includes: an oscillating electric motor or linear motor controlled by control circuitry; a battery connected to the oscillating electric or linear motor; and charge detection circuitry configured to determine a charging state of the battery. The charge detection circuitry is coupled to the control circuitry such that, in response to the charge detection circuitry determining that the charging state of the battery reaches a predetermined threshold, the control circuitry activates the oscillating electric motor or linear motor to cause noise generated by the motor to perceptibly change to indicate a threshold charging state.

17 Claims, 1 Drawing Sheet

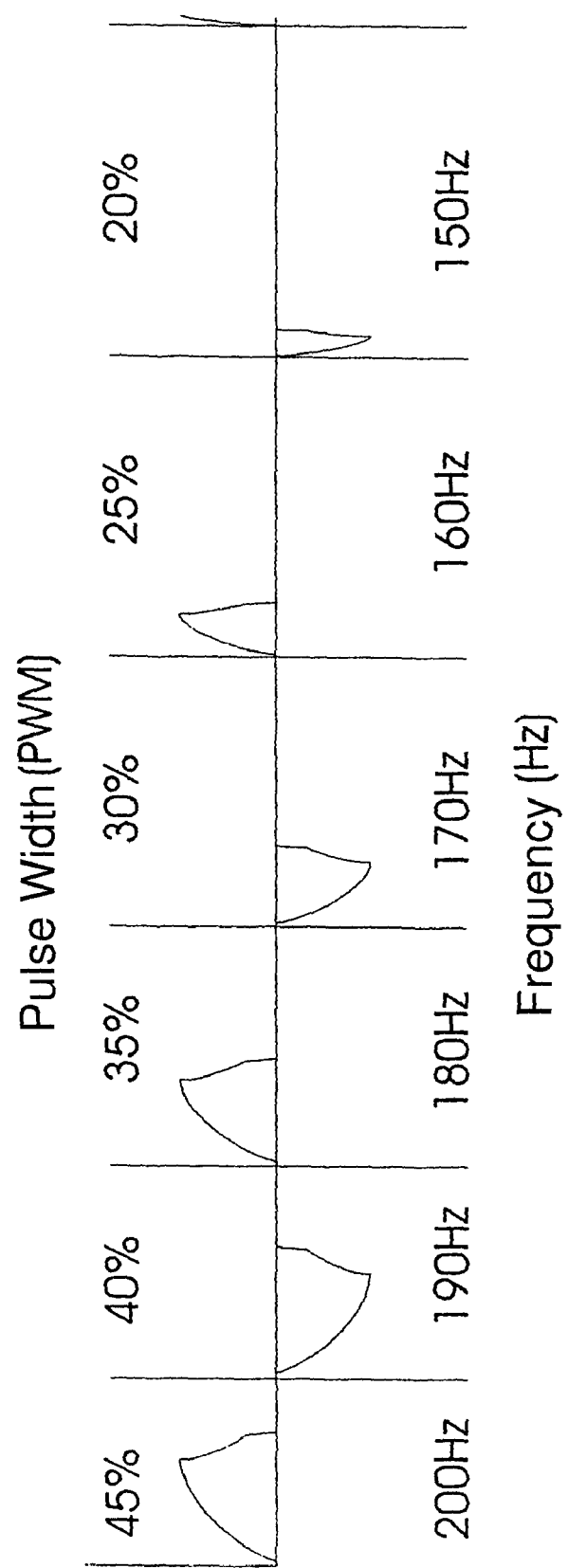

INDICATING CHARGING STATE OF HANDHELD ELECTRIC APPLIANCE

TECHNICAL FIELD

The invention generally relates to indicating the charging state of a handheld electric appliance such as, for example, an electric hair clipper or an electric toothbrush that is driven by an oscillating electric motor or linear motor.

BACKGROUND

EP 0 712 007 B1 discloses a battery-operated razor with a charging state indicator and a device that detects a charging state, at which the battery is discharged to such a degree that the razor can only continue to operate for a very short time. When this charging state is reached, a pulse-width modulator supplies the DC motor of the razor with a pulsating voltage of constant frequency, the pulse-duty factor of which is gradually reduced to zero such that the motor speed is reduced accordingly. This makes a user aware of the fact that the motor and therefore also the cutting tool driven by the motor will soon stop such that the user will intuitively stop shaving before beard hairs can get caught in the stopped cutting tool.

There also exist battery-operated razors and electric toothbrushes that are driven by an oscillating electric motor or linear motor. These motors have a resonant frequency, with which they generally need to be operated in order to achieve an adequate efficiency. When the battery voltage drops as the battery is increasingly discharged, these motors continue to run with their resonant frequency at a reduced amplitude. Consequently, a user is unable to determine that the motor will soon stop due to a discharged battery based on the motor noise. The user may misinterpret this sudden stop as a defect, wherein the sudden stop of a razor may lead to beard hairs getting caught in the razor and the pain associated therewith. Thus, attempts have been made to make the user aware of the empty battery and the impending stop of the motor in a timely fashion with a beeping and blinking indicator.

SUMMARY

In one aspect, the invention features a charging state indicator for handheld electric appliances driven by an oscillating electric motor or linear motor is provided that may be easier to recognize for a user.

This is accomplished, for example, with a small electrical device that contains a primary battery or a secondary battery and a circuit for determining the charging state of the battery, wherein the small electrical device is driven by an oscillating electric motor or linear motor that is activated by an electronic circuit with a pulse-width modulated control signal, wherein the control circuit causes the motor noise to change when a certain charging state is reached or the charge falls below that state. If the charging state of the battery falls below a threshold value during the operation of the device, the oscillating electric motor or linear motor is preferably activated by the control circuit in such a way that its motor noise changes analogous to a D.C. motor in the same situation. The change of the motor noise therefore represents an acoustic charging state indicator for the user that is also known from other battery-operated electrical devices and therefore enables the user to intuitively and correctly interpret the change of the motor noise as a nearly empty battery.

In another aspect, a handheld electric appliance includes: an oscillating electric motor or linear motor controlled by control circuitry; a battery connected to the oscillating electric or linear motor; and charge detection circuitry configured to determine a charging state of the battery. The charge detection circuitry is coupled to the control circuitry such that, in response to the charge detection circuitry determining that the charging state of the battery reaches a predetermined threshold, the control circuitry activates the oscillating electric motor or linear motor to cause noise generated by the motor to perceptibly change to indicate a threshold charging state. In some implementations, the control circuitry activates the oscillating electric motor or linear motor with a control signal of decreasing frequency and/or decreasing pulse-duty factor upon the charge detection circuitry determining that the charging state of the battery has reached the predetermined threshold. The predetermined threshold, in some implementations, is chosen such that the battery still has a sufficient charge for operating the handheld electric appliance until the control circuitry has changed the control signal to such a degree that the oscillating electric motor or linear motor ultimately stops. In some examples, the handheld electric appliance consists of an electric razor, an electric hair clipper, or an electric toothbrush.

In another aspect, indicating a threshold charging state of a battery in a handheld electric appliance driven by an oscillating electric motor or linear motor controlled by control circuitry is accomplished by: determining the charging state of the battery reaches a predetermined threshold; and then activating the oscillating electric motor or linear motor to cause noise generated by the motor to perceptibly change to indicate the threshold charging state. In some examples, activating the oscillating electric motor or linear motor is accomplished with a control signal of decreasing frequency and/or decreasing pulse-duty factor when the charging state of the battery reaches the predetermined threshold. In some examples, the predetermined threshold is chosen such that the battery still has a sufficient charge for operating the handheld electric appliance until the control circuitry has changed the control signal to such a degree that the oscillating electric motor or linear motor ultimately stops. In some examples, the handheld electric appliance consists of an electric razor, an electric hair clipper, or an electric toothbrush.

In another aspect, indicating an impending stop of a motor in a handheld electric appliance is accomplished by: determining and indicating to control circuitry coupled with the motor that a charge state of the battery reaches a predetermined threshold; and responsive to the indication that the predetermined threshold is reached, activating the oscillating electric motor or linear motor to cause noise generated by the motor to perceptibly change to indicate the impending stop of the motor. In some implementations, determining the charge state of the battery includes detecting when a voltage of the battery falls below a threshold voltage. In some examples, activating the oscillating electric motor or linear motor includes activating the motor with a control signal. In some examples, a frequency and/or a pulse-duty factor of the control signal decreases responsive to the indication that the predetermined threshold is reached. In some implementations, the predetermined threshold is chosen such that the battery still has a sufficient charge for operating the handheld electric appliance until the control circuitry has changed the control signal to such a degree that the oscillating electric motor or linear motor ultimately stops. In some implementations, the handheld electric appliance is selected from the group consisting of: an electric razor, an electric hair clipper, and an electric toothbrush.

DESCRIPTION OF DRAWINGS

FIG. 1 is a control signal pulse pattern.

DETAILED DESCRIPTION

The control circuit for the oscillating electric motor or linear motor is realized conventionally, but connected to a circuit for determining the charging state of the battery that delivers a corresponding warning signal to the control circuit when a certain charging state of the battery is reached or the charge falls below that state. The control circuit usually delivers a pulse-width modulated control signal, the frequency of which is adapted to the mechanical resonant frequency of the oscillating electric motor or linear motor, wherein said control signal is controlled in such a way that the oscillating electric motor or linear motor remains resonant. In order to change the motor noise of the oscillating electric motor or linear motor, it is necessary to break the rule, according to which the oscillating electric motor or linear motor always needs to be operated with its resonant frequency, in order to achieve an optimal efficiency. The control circuit is designed in such a way that it ceases controlling the control signal based on the warning signal delivered by the circuit for determining the charging state and instead activates the oscillating electric motor or linear motor with a frequency other than the resonant frequency such that it oscillates with the frequency defined by the control signal, however, with a much higher current consumption. In this context, it should be noted that—depending on the resonance characteristics of the motor—the linear motor practically no longer has an oscillation amplitude when it is activated outside the resonant range. However, the changed motor noise can still be perceived, primarily due to the effective electromagnetic forces. A gradual speed change as described for a DC motor in EP 0 712 007 B1 is not advisable with an oscillating electric motor or linear motor that can only be operated in a resonant fashion, because such oscillating electric motors or linear motors tend to have such an inferior efficiency outside the resonant frequency that they can no longer be excited to carry out an oscillation with noteworthy amplitude—at an increased current consumption. A change of the pulse-duty factor of the pulse-width modulated signal would merely lead to a change of the oscillation amplitude in an oscillating electric motor or linear motor. As such, the motor would continue to oscillate with its resonant frequency such that no change of the motor noise would occur. Due to the increased current consumption outside the resonant range, it is advantageous to not only change the frequency, but to also reduce the pulse-duty factor of the pulse-width modulated signal so as to prevent the voltage of the battery, which is already near empty, from breaking down completely. In addition, the volume of the motor noise is also reduced in this fashion, such that the user conventionally interprets this reduction of the motor noise volume as an indicator for an impending stop of the motor.

The charging state of the battery can be conventionally detected, for example, by measuring the battery voltage. It is preferred to define a threshold value for the battery voltage, wherein this threshold value corresponds to a charging state, at which the small electrical device can still be operated for a few minutes. This ensures that the small electrical device can continue to operate at least until the control circuit changes its control signals and the frequency and/or amplitude of the motor noise is reduced, namely to such a degree that the oscillating electric motor and linear motor ultimately stops. The control circuit preferably changes the motor noise for a period of time that lies between 5 and 30 seconds, preferably 10 to 20 seconds. This provides the user with sufficient time to stop using the small electrical device. In case of an electric hair clipper or an electric razor, this makes it possible to prevent hairs of a user from getting caught in the stopped cutting tool and the pain associated therewith.

FIG. 1 shows a control signal by pulses that is generated by the electronic control device of the battery-operated small electrical device after the circuit for determining the charging state of the battery has determined that a threshold value for the charging state of the battery has been reached or the charge has fallen below that threshold value. This control signal has a pulse pattern, the frequency of which is reduced over time from a value of 200 Hz in increments of 10 Hz. Its pulse width is simultaneously reduced from 45% in increments of 5%. The frequency and/or the pulse width naturally may also change in other increments or continuously. The rate of change or the increment is preferably chosen such that it takes approximately 5 to 30 seconds, preferably 10 to 20 seconds, until the frequency and/or pulse width is reduced to zero or nearly zero.

According to the FIGURE, the frequency and the pulse-duty factor of a control signal, with which the oscillating electric motor or linear motor was operated in a resonant fashion (frequency 200 Hz, pulse width 45%) is continuously reduced after it is detected that the battery is nearly empty. This reduction continues until the oscillating electric motor or linear motor stops, i.e., until the frequency and/or the pulse-duty factor of the control signal have reached zero, if necessary. As described above, the reduction of the frequency of the control signal leads to an operation of the oscillating electric motor or linear motor outside the resonant range such that the amplitude of the oscillation quickly breaks down due to the significantly deteriorated efficiency while the motor generates a noise of decreasing frequency due to the effective electromagnetic forces, wherein the user is familiar with such a noise of decreasing frequency from a DC motor that is operated with a weak battery. The simultaneous reduction of the pulse width merely leads to a reduced power supply of the oscillating electric motor or linear motor that is operated outside the resonant range, but not to a change of the motor noise.

The invention claimed is:

1. A handheld electric appliance, comprising
   an oscillating electric motor or linear motor having a mechanical resonant frequency and controlled according to a control signal having a frequency adapted to the mechanical resonant frequency and provided by control circuitry;
   a battery connected to the oscillating electric or linear motor; and
   charge detection circuitry coupled to the battery and the control circuitry and configured to determine a charging state of the battery,
   wherein the control signal frequency changes according to the determined charging state.

2. The handheld electric appliance of claim 1, wherein the control signal has a decreasing frequency according to the determined charging state.

3. The handheld electric appliance of claim 2, wherein the control signal is of decreasing pulse-duty factor according to the determined charging state.

4. The handheld electric appliance of claim 2, comprising a predetermined threshold charging state wherein the battery at the predetermined threshold charging state has a sufficient charge for operating the handheld electric appliance until the changed control signal stops the oscillating electric motor or linear motor.

5. The handheld electric appliance of claim 1, wherein the handheld electric appliance is selected from the group consisting of: an electric razor, an electric hair clipper, and an electric toothbrush.

6. A method of indicating a threshold charging state of a battery in a handheld electric appliance driven by an oscillating electric motor or linear motor having a mechanical resonant frequency and controlled according to a control signal having a frequency adapted to the mechanical resonant frequency and provided by control circuitry, the method comprising:

providing charge detection circuitry coupled to the control circuitry and adapted to determine a charging state of the battery;

determining the charging state of the battery equals a predetermined threshold state; and changing the control signal according to the determined charging state.

7. The method of claim 6, wherein the step of changing the control signal comprises providing a control signal of decreasing frequency.

8. The method of claim 7, wherein the step of changing the control signal comprises providing a control signal of decreasing pulse-duty factor.

9. The method of claim 7, further comprising the step of predetermining the threshold such that the battery still has a sufficient charge for operating the handheld electric appliance until the changed control signal stops the oscillating electric motor or linear motor.

10. The method of claim 6, wherein the handheld electric appliance is selected from the group consisting of: an electric razor, an electric hair clipper, and an electric toothbrush.

11. A method of indicating an impending stop of a motor in a battery powered handheld electric appliance driven by an oscillating electric motor or linear motor having a mechanical resonant frequency and controlled according to a control signal having a frequency adapted to the mechanical resonant frequency and provided by control circuitry, the method comprising:

determining and indicating to control circuitry coupled with the motor that a charge state of the battery reaches a predetermined threshold; and changing the control circuitry output to the motor according to the determined charge state.

12. The method of claim 11, wherein determining the charge state of the battery comprises detecting when a voltage of the battery falls below a threshold voltage.

13. The method of claim 11, wherein activating the oscillating electric motor or linear motor comprises activating the motor with a control signal.

14. The method of claim 13, wherein changing the control circuitry output comprises decreasing a frequency of the control signal.

15. The method of claim 13, wherein changing the control circuitry output comprises decreasing a pulse-duty factor of the control signal.

16. The method of claim 11, further comprising the step of predetermining the threshold such that the battery still has a sufficient charge for operating the handheld electric appliance until the changed control signal stops the oscillating electric motor or linear motor.

17. The method of claim 11, wherein the handheld electric appliance is selected from the group consisting of: an electric razor, an electric hair clipper, and an electric toothbrush.

\* \* \* \* \*